US010277769B2

(12) United States Patent
Akiyoshi

(10) Patent No.: US 10,277,769 B2
(45) Date of Patent: Apr. 30, 2019

(54) IMAGE FORMING APPARATUS AND JOB EXECUTION MANAGEMENT METHOD THEREFOR

(71) Applicant: Kunihiro Akiyoshi, Fukuoka (JP)

(72) Inventor: Kunihiro Akiyoshi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/726,869

(22) Filed: Oct. 6, 2017

(65) Prior Publication Data

US 2018/0109694 A1 Apr. 19, 2018

(30) Foreign Application Priority Data

Oct. 18, 2016 (JP) .................................. 2016-204407

(51) Int. Cl.
H04N 1/04 (2006.01)
G06F 3/12 (2006.01)
H04N 1/21 (2006.01)
H04N 1/32 (2006.01)
H04N 1/00 (2006.01)

(52) U.S. Cl.
CPC ............ *H04N 1/04* (2013.01); *G06F 3/1237* (2013.01); *H04N 1/00917* (2013.01); *H04N 1/21* (2013.01); *H04N 1/32* (2013.01); *H04N 1/32443* (2013.01)

(58) Field of Classification Search
CPC ........................................ H04N 1/04
USPC ........................................ 358/1.15
See application file for complete search history.

(56) References Cited

U.S. PATENT DOCUMENTS

| 7,280,238 | B2 | 10/2007 | Akiyoshi | |
|---|---|---|---|---|
| 7,787,137 | B2 | 8/2010 | Akiyoshi | |
| 8,064,078 | B2 | 11/2011 | Akiyoshi | |
| 8,294,922 | B2 | 10/2012 | Akiyoshi | |
| 8,508,763 | B2 | 8/2013 | Akiyoshi | |
| 8,614,807 | B2 | 12/2013 | Akiyoshi | |
| 8,964,208 | B2 | 2/2015 | Akiyoshi | |
| 9,282,218 | B2 | 3/2016 | Akiyoshi | |
| 2012/0002230 | A1* | 1/2012 | Yamazaki | ................. B41J 3/60 358/1.13 |

FOREIGN PATENT DOCUMENTS

JP 2008-165725 7/2008

* cited by examiner

*Primary Examiner* — Jacky X Zheng
(74) *Attorney, Agent, or Firm* — IPUSA, PLLC

(57) ABSTRACT

An image forming apparatus is provided that includes a scanning unit that performs a scanning operation of scanning each page of a document to acquire image data, and a printing unit that performs a printing operation of printing data based on the image data acquired by the scanning unit in parallel with the scanning operation by the scanning unit. The image forming apparatus further includes a control unit that controls the printing unit to stop the printing operation before the printing operation is performed with respect to all the image data acquired by the scanning unit, and controls the printing unit to resume the printing operation with respect to data that is stored in a storage unit based on the image data acquired by the scanning unit while the printing operation is stopped when the data that is stored in the storage unit reaches a first threshold value.

9 Claims, 6 Drawing Sheets

IMAGE FORMING APPARATUS AND JOB EXECUTION MANAGEMENT METHOD THEREFOR

CROSS-REFERENCE TO RELATED APPLICATIONS

The present application claims priority under 35 U.S.C. § 119 to Japanese Patent Application No. 2016-204407 filed on Oct. 18, 2016, the entire contents of which are incorporated herein by reference.

BACKGROUND OF THE INVENTION

1. Field of the Invention

The present invention relates to an image forming apparatus and an information processing method.

2. Description of the Related Art

In image forming apparatuses, such as a copying machine or a multifunction peripheral (MFP), a copying process is implemented by combined operations of a scanner and a printer. That is, image data acquired by scanning a document with the scanner is printed by the printer to thereby implement the copying process.

In order to accelerate the speed of a copying process, the scanner and the printer may be operated in parallel. In this case, the scanner successively scans each page of a document to acquire image data without waiting for the printer to complete printing. The image data acquired by the scanner is stored in a buffer. The printer successively prints the image data stored in the buffer without waiting for image data of all the pages of the document to be scanned.

On the other hand, some image forming apparatuses have a function of imposing a use limit, such as the maximum number of sheets, with respect to each user (hereinafter referred to as "use limit function"). For example, when the use limit function is implemented in an image forming apparatus, a remaining number of points assigned to a login user (hereinafter referred to as "remaining number") based on a maximum allowance may be reduced each time paper is discharged from the image forming apparatus, and a copying process may be stopped when the remaining number becomes 0 (zero).

Such a use limit function is implemented by a program installed in the image forming apparatus. On the other hand, hardware such as a scanner and a printer may perform operations irrespective of the operations of such a program. Thus, while the program detects the printer discharging paper, deducts the remaining number of points, and determines whether the remaining number has reached 0, scanning operations by the scanner and printing operations by the printer may be executed in parallel at high speed. In this case, by the time the program detects that the remaining number has reached 0, copying on a number of sheets beyond the number allowed based on the remaining number of points may already be performed.

SUMMARY OF THE INVENTION

According to one embodiment of the present invention, an image forming apparatus is provided that includes a scanning unit configured to perform a scanning operation of scanning each page of a document to acquire image data, and a printing unit configured to perform a printing operation of printing data based on the image data acquired by the scanning unit in parallel with the scanning operation by the scanning unit. The image forming apparatus further includes a control unit configured to control the printing unit to stop the printing operation before the printing operation is performed with respect to all the image data acquired by the scanning unit, and control the printing unit to resume the printing operation with respect to data that is stored in a storage unit based on the image data acquired by the scanning unit while the printing operation is stopped, the printing operation being resumed when the data that is stored in the storage unit reaches a first threshold value.

DESCRIPTION OF THE EMBODIMENTS

An aspect of the present invention is directed to providing a technique for preventing the execution of output beyond a prescribed limit.

In the following, embodiments of the present invention are described with reference to the accompanying drawings.

Figure 1:
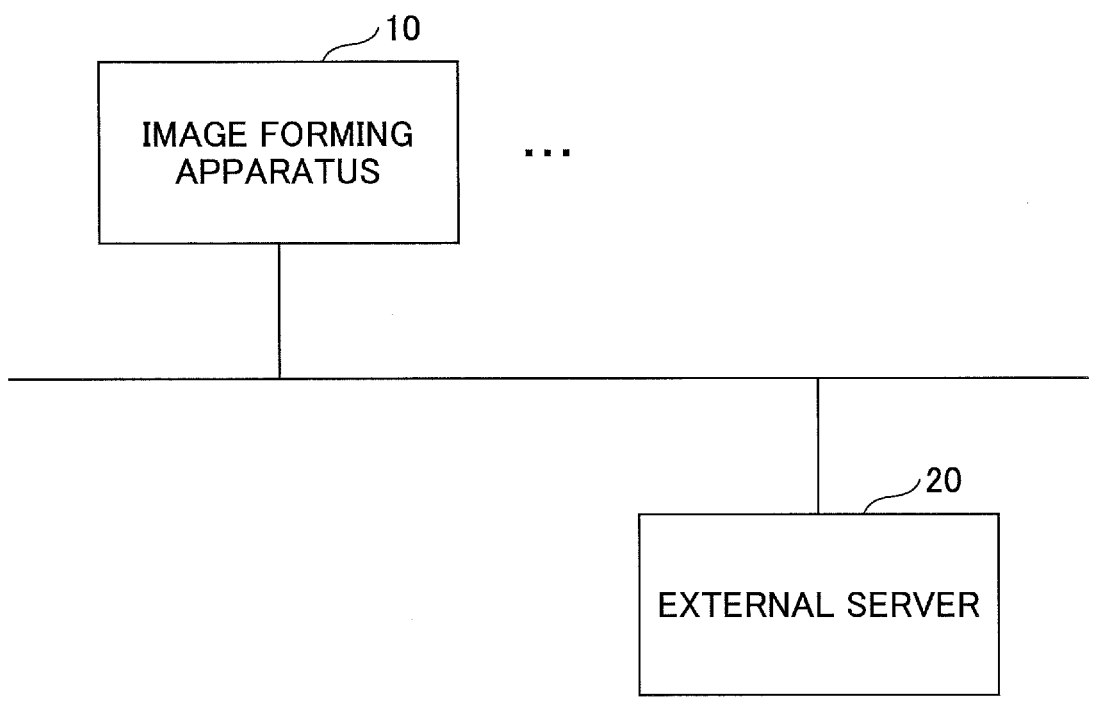
FIG. 1 is a diagram illustrating an example system configuration according to an embodiment of the present invention.

FIG. 1 is a diagram illustrating an example system configuration according to an embodiment of the present invention. In FIG. 1, one or more image forming apparatuses 10 are connected to an external server 20 via a network, such as a LAN (Local Area Network) or the Internet.

The image forming apparatus 10 is capable of executing a copying process. In the present embodiment, it is assumed that the image forming apparatus 10 is a multifunction peripheral (MFP).

The external server 20 is a computer that stores a remaining number in association with each user of the image forming apparatus 10. The remaining number represents the remaining number of points assigned to a user with regard to use of the image forming apparatus 10. The points assigned to each user define the extent to which the user is allowed to use the image forming apparatus 10. Thus, a user with a remaining number of points that has already reached 0 cannot use the image forming apparatus 10. In the present embodiment, the remaining number decreases in accordance with the execution of copying (printing).

Figure 2:
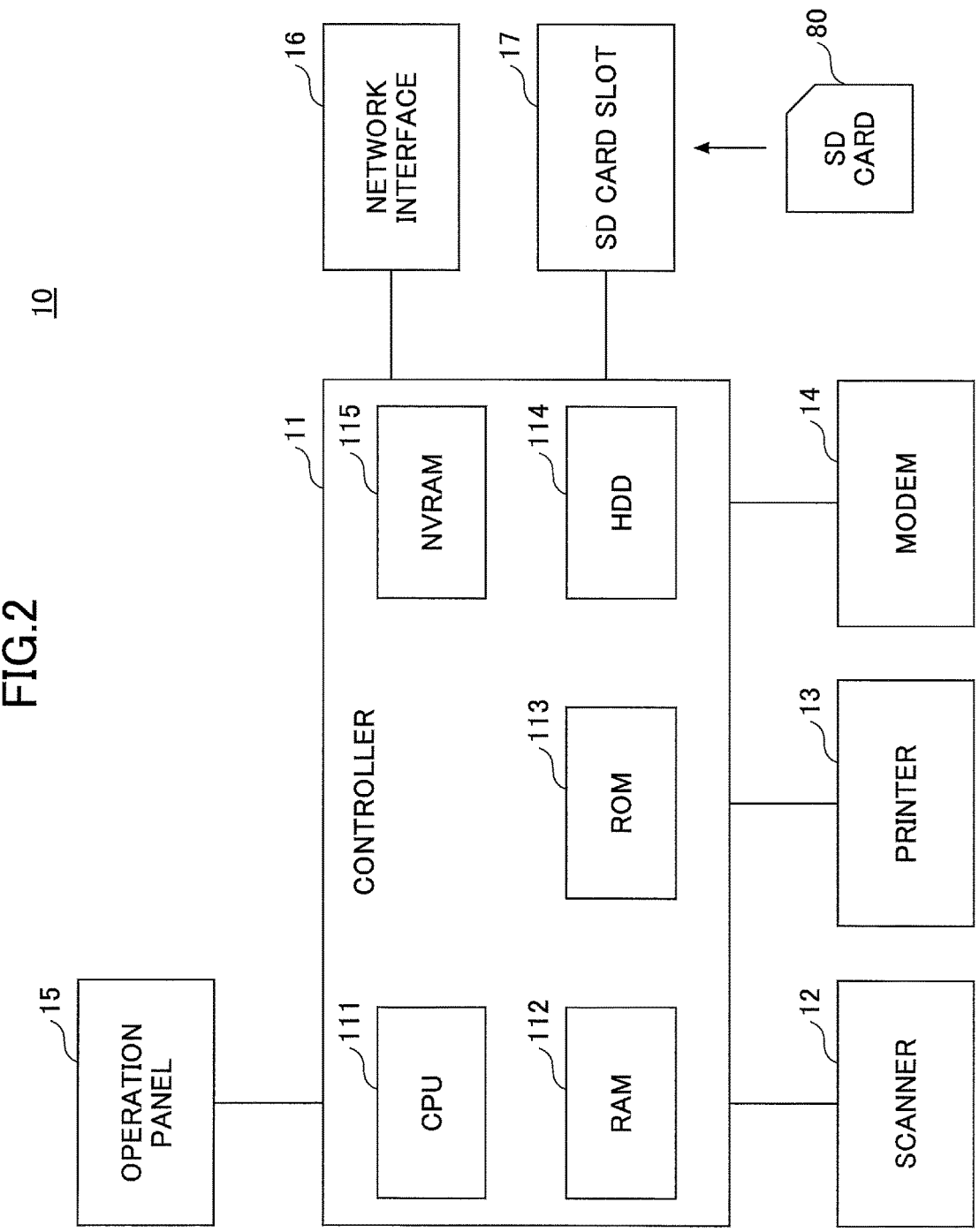
FIG. 2 is a diagram illustrating an example hardware configuration of an image forming apparatus according to an embodiment of the present invention.

FIG. 2 is a diagram illustrating an example hardware configuration of the image forming apparatus 10 according to an embodiment of the present invention. In FIG. 2, the image forming apparatus 10 includes hardware, such as a controller 11, a scanner 12, a printer 13, a modem 14, an operation panel 15, a network interface 16, and an SD card slot 17.

The controller 11 includes a CPU 111, a RAM 112, a ROM 113, an HDD 114, and an NVRAM 115. The ROM 113 stores various programs and data used by the various programs, for example. The RAM 112 is used as a storage area for loading a program and a work area of a loaded program, for example. The CPU 111 implements various functions by executing processes based on one or more programs loaded in the RAM 112. The HDD 114 stores various programs and data used by the various programs, for example. The NVRAM 115 stores various setting information and the like.

The scanner 12 is hardware (image scanning unit) for scanning a document and acquiring image data of the document. The printer 13 is hardware (printing unit) for printing print data on a print medium, such as paper. The modem 14 is hardware for establishing connection with a telephone line, and is used for transmission/reception of image data by facsimile communication. The operation panel 15 is hardware including an input unit, such as buttons for accepting an input from a user, and a display unit, such as a liquid crystal panel, for example. The liquid crystal panel may have a touch panel function, for example. In this case, the liquid crystal panel also functions as an input unit. The network interface 16 is hardware for establishing connection with a network, such as a LAN (local area network, which may be wired or wireless). The SD card slot 17 is used for reading a program stored in an SD card 80. That is, in the image forming apparatus 10, not only a program stored in the ROM 113 but also a program stored in the SD card 80 can be loaded into the RAM 112 and executed. Note that the SD card 80 may be replaced by another recording medium (e.g., a CD-ROM or a USB (Universal Serial Bus) memory). That is, the recording medium used to implement the functions of the SD card 80 of the present embodiment is not limited to a particular type of recording medium. In this case, the SD card slot 17 may be replaced by hardware corresponding to the type of the recording medium used.

Figure 3:
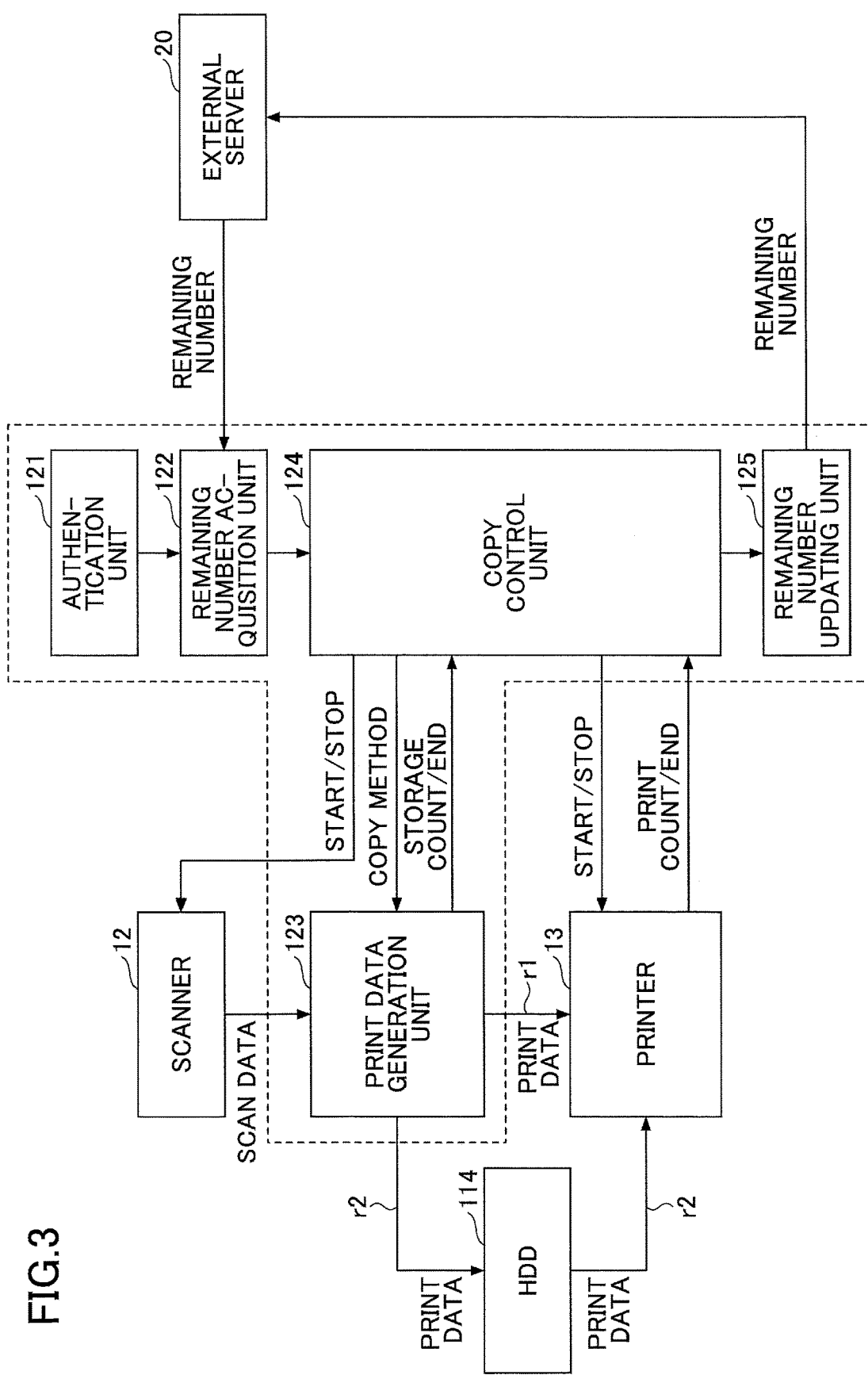
FIG. 3 is a diagram illustrating an example functional configuration of the image forming apparatus according to an embodiment of the present invention.

FIG. 3 is a diagram illustrating an example functional configuration of the image forming apparatus 10 according to an embodiment of the present invention. In FIG. 3, elements surrounded by a broken line are implemented by one or more programs installed in the image forming apparatus 10. That is, the image forming apparatus 10 includes an authentication unit 121, a remaining number acquisition unit 122, a print data generation unit 123, a copy control unit 124, and a remaining number updating unit 125 as functional units implemented by a program. Each of these functional units may be implemented by the CPU 111 executing a process based on one or more programs installed in the image forming apparatus 10.

The authentication unit 121 executes an authentication process with respect to a user that makes a login request to log into the image forming apparatus 10 (hereinafter referred to as "login user"). The user that is authenticated is given permission to use the image forming apparatus 10. Note that identification information of the login user (hereinafter referred to as "login user name") is specified by the authentication process.

The remaining number acquisition unit 122 acquires the remaining number associated with the login user name from the external server 20. In the external server 20, the remaining number is stored in association with each user name.

The print data generation unit 123 generates print data based on image data of each page of a document scanned by the scanner 12 (hereinafter referred to as "scan data") and copy conditions set up for a copy job (copying process) for the scan data. For example, if a copy condition to copy scanned images of two pages of a document on two sides is set up, the print data generation unit 123 generates print data for printing the scanned images on two sides. If a copy condition to combine scanned images of two pages of a document and print the combined image on one side is set up, the print data generation unit 123 generates print data combining the two scanned images of two pages of the document to be printed on one side.

The copy control unit 124 controls execution of a copy job (copying process). For example, when a copy job is started, the copy control unit 124 instructs the scanner 12 and the printer 13 to start scanning or printing operations. Further, the copy control unit 124 controls the copy job so that the number of sheets copied (the number of sheets printed) is within an allowed range based on the remaining number.

The remaining number updating unit 125 reflects a change in the remaining number resulting from execution of a copy job in the external server 20.

Figure 4:
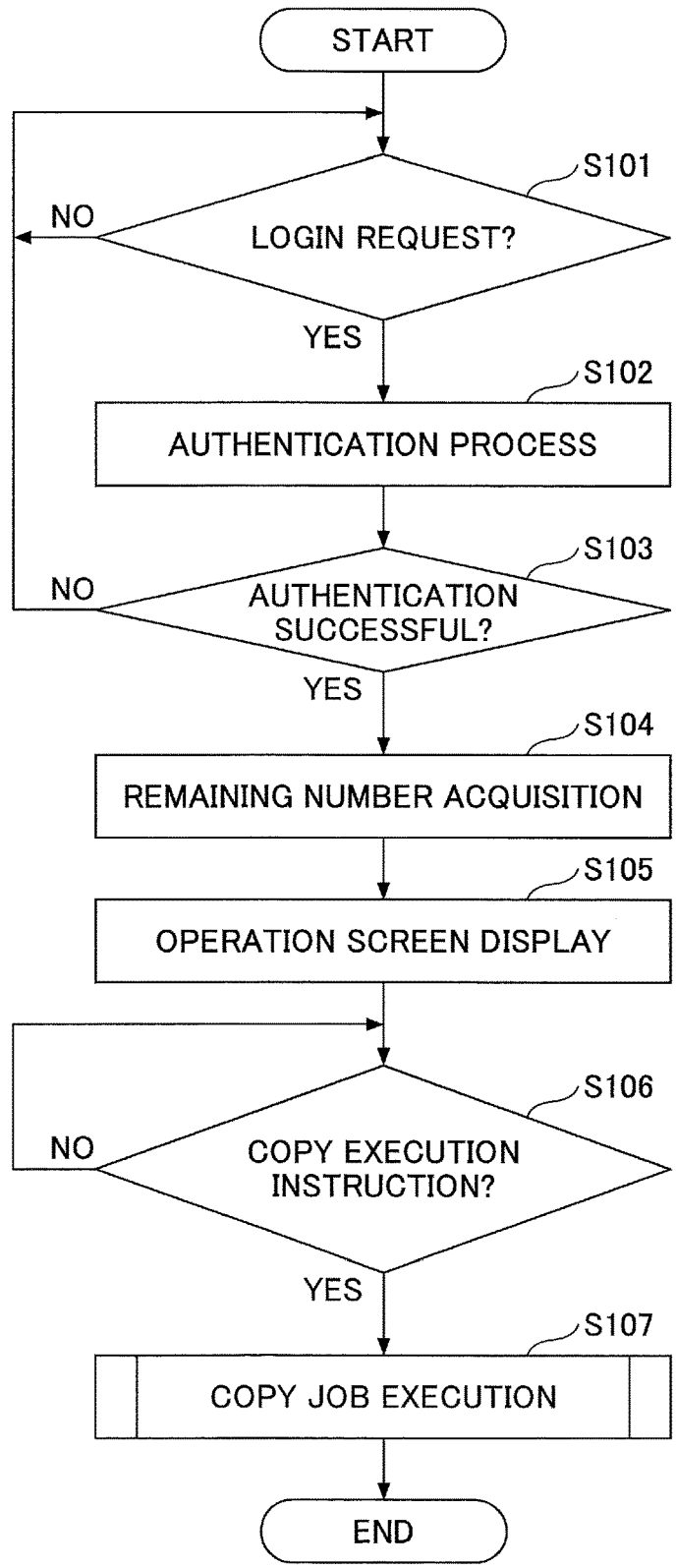
FIG. 4 is a flowchart illustrating example process operations executed by the image forming apparatus.

In the following, process operations executed by the image forming apparatus 10 will be described. FIG. 4 is a flowchart illustrating example process operations executed by the image forming apparatus 10.

For example, when a login request is made by a user by inputting authentication information, such as a user name and a password, via a login screen displayed on the operation panel 15 (YES in step S101), the authentication unit 121 performs an authentication process with respect to the input user name and password (step S102). For example, the authentication unit 121 may determine whether the input user name and password matches the correct user name and password stored in the image forming apparatus 10 or the external server 20. Note that the authentication information input by the user may be information other than a user name and a password. For example, an IC card may be held against the image forming apparatus 10. In this case, authentication may be performed based on information stored in the IC card.

If the authentication process ends in failure (NO in step S103), the user is not permitted to login. If the authentication process is successful (YES in step S103), the remaining number acquisition unit 122 acquires the remaining number associated with the input user name (login user name) from the external server 20 (step S104). Then, the copy control unit 124 displays an operation screen for accepting an operation from the user via the operation panel 15 (step S105).

Thereafter, when a copy condition is input via the operation screen and a copy execution instruction is input by the user (YES in step S106), the copy control unit 124 controls execution of a copy job (step S107). Note that a copy condition refers to setting information (attribute information) relating to a copy job, such as color/monochrome, single side/double side, combining number, and resolution, for example.

Figure 5A:
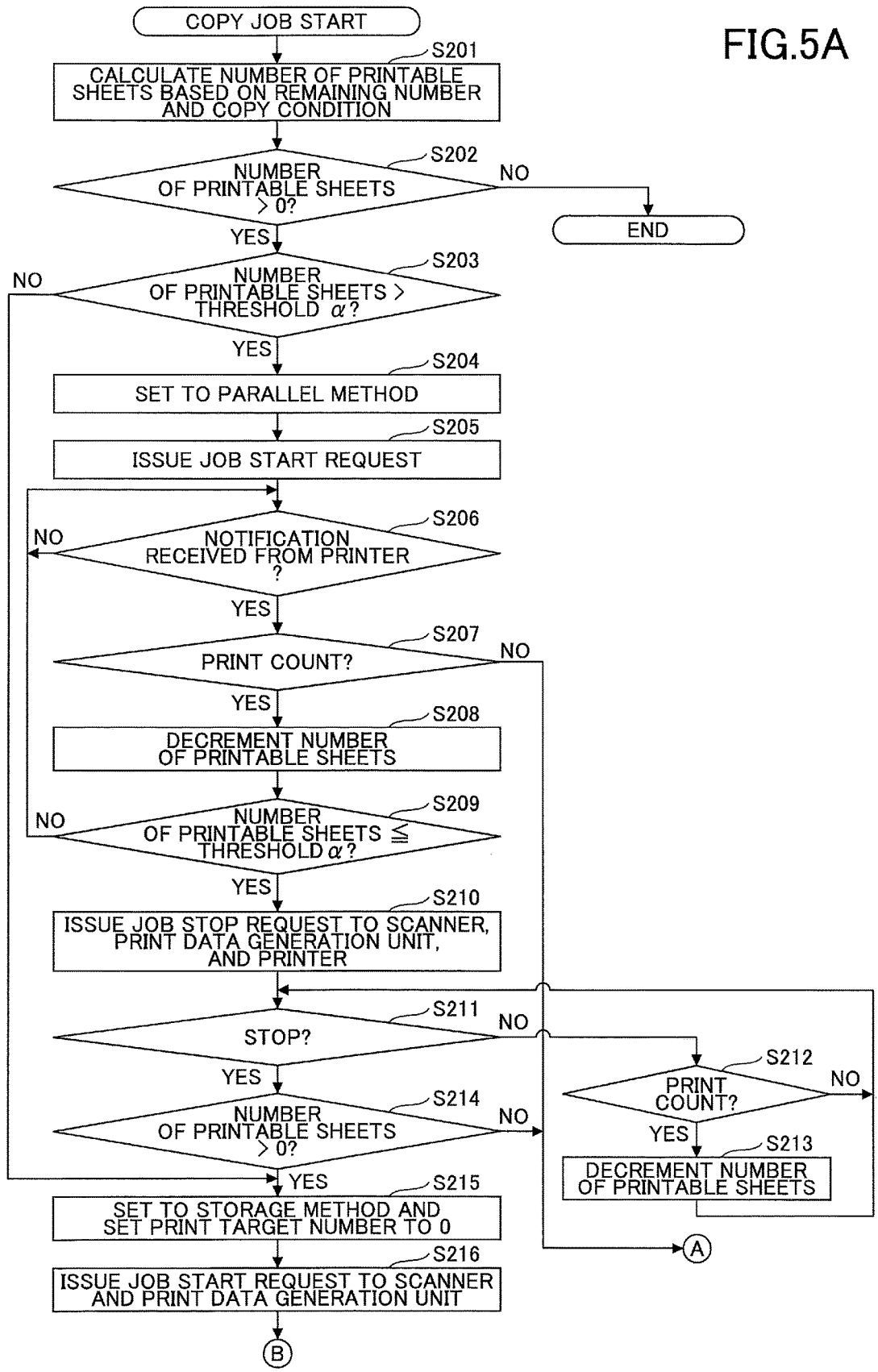
FIGS. 5A and 5B are flowcharts illustrating example process operations of a copy job control process.
Figure 5B:
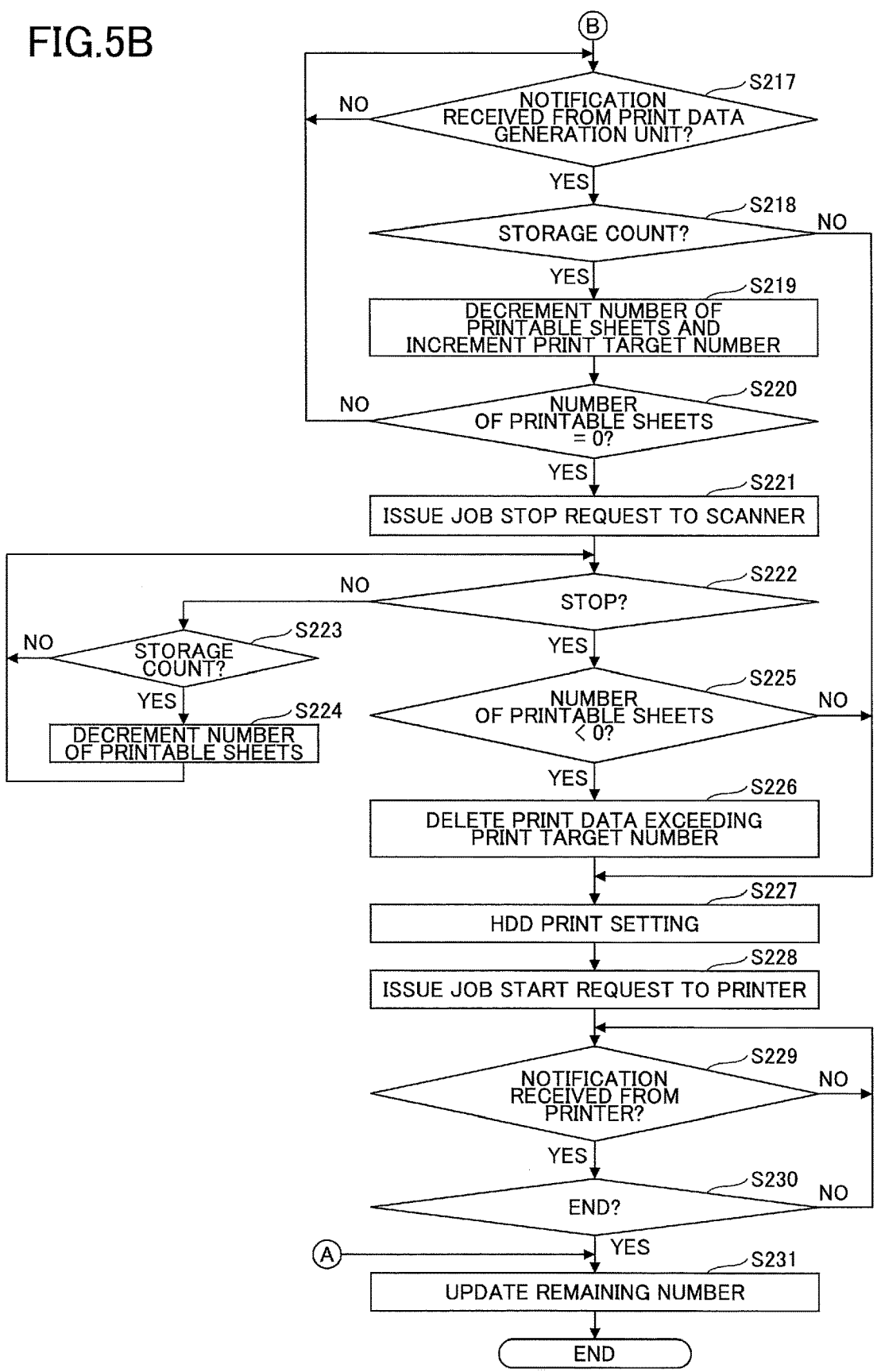

In the following, the copy job control process of step S107 will be described in further detail. FIGS. 5A and 5B are flowcharts illustrating example process operations of the copy job control process.

In step S201, the copy control unit 124 calculates a number of printable sheets based on the remaining number and the copy condition. The number of printable sheets is the number of sheets that are allowed be printed. Note that the number of printable sheets is calculated based on the remaining number and the copy condition because the number of printable sheets can differ depending on the copy condition even when the remaining number is the same, for example. That is, the consumption rate of the remaining number of points with respect to printing (copying) on one sheet may vary depending on the copy condition. For example, the consumption rate of the remaining number of points for color printing may be double the consumption rate for monochrome printing, and the consumption rate for duplex printing may be double the consumption rate for single-sided printing. As such, in step S201, the remaining number is converted into a corresponding number of printable sheets indicating the number of sheets that are allowed be printed. For example, based on the copy condition, the consumption rate of the remaining number of points per page may be calculated, and the number of printable sheets may be calculated by dividing the remaining number by the consumption rate.

Then, the copy control unit 124 determines whether the number of printable sheets is greater than 0 (step S202). If the number of printable sheets is not greater than 0 (NO in step S202), the copy control unit 124 refrains from executing the copy job. On the other hand, if the number of printable sheets is greater than 0 (YES in step S202), the copy control unit 124 determines whether the number of printable sheets is greater than a threshold value $\alpha$ (step S203).

The threshold value $\alpha$ is a threshold value for determining the timing at which the operation method of the scanner 12 and the printer 13 in executing a copy job is to be switched from a parallel method to a storage method based on the remaining number.

The parallel method is an operation method in which the scanner 12 and the printer 13 operate in parallel. In the parallel method, the scanner 12 successively scans each page of a document to acquire image data (scan data) without waiting for the printer 13 to complete printing. The print data generation unit 123 generates print data each time the scan data for one sheet of printing paper is stored based on the print condition. The generated print data is directly transferred to the printer 13 as indicated by an arrow r1 in FIG. 3. More specifically, the print data is stored in a buffer formed in a storage area, such as the RAM 112, that is speedily accessible. Also, in the parallel method, the printer 13 prints out print data on printing paper as soon as the print data is stored in the buffer in parallel with the scanning operation by the scanner 12 (i.e., without waiting for the scanner 12 to complete scanning of all the pages of a document). Each time the printer 13 completes printing (or discharge) of one sheet of printing paper, the printer 13 notifies the copy control unit 124 of an event indicating the completion of printing of one sheet (hereinafter referred to as "print count").

On the other hand, the storage method is an operation method in which print data is transferred from the print data generation unit 123 to the printer 13 via the HDD 114, which has a large-capacity storage area, as indicated by arrows r2 in FIG. 3. That is, when switching to the storage method, the print data generation unit 123 stores (accumulates) the generated print data in the HDD 114. Each time print data of one sheet is stored in the HDD 114, the print data generation unit 123 notifies the copy control unit 124 of an event indicating completion of the storage of the print data (hereinafter referred to as "storage count"). The printer 13 waits for an instruction from the copy control unit 124 before printing the print data stored in the HDD 114. When print data for the number of printable sheets that are allowed to be printed based on the remaining number is stored in the HDD 114, the copy control unit 124 stops the scanning operation by the scanner 12 and instructs the printer 13 to execute a printing operation. In response to the instruction, the printer 13 prints out the print data stored in the HDD 114. In this way, printing beyond the number of printable sheets that are allowed based on the remaining number may be prevented.

That is, the threshold value $\alpha$ is a value for securing leeway for preventing printing beyond a prescribed limit based on the remaining number. However, as the threshold value $\alpha$ is increased, the timing at which the operation method is switched from the parallel method to the storage system is accelerated such that the time required for completing the copy job may be increased. As such, the threshold value $\alpha$ is desirably set to the smallest value possible that can still secure adequate leeway for preventing printing beyond the prescribed limit. The leeway that needs to be secured may vary depending on the performance of the image forming apparatus 10. For example, more leeway may need to be secured for a high-speed machine as compared with a low-speed machine. Thus, a larger threshold value $\alpha$ has to be set up for a high-speed machine as compared with a low-speed machine. Note that if the RAM 112 has sufficient storage capacity, the RAM 112 may be used even in the storage method, for example.

Then, the copy control unit 124 sets up the print data generation unit 123 and the printer 13 to operate in the parallel method (step S204). Note that the copy control unit 124 also sets up copy conditions input by the user in the print data generation unit 123.

Then, the copy control unit 124 issues a job start request to the scanner 12 and the printer (step S205). As a result, the scanner 12, the print data generation unit 123, and the printer 13 execute a copy job in the parallel method.

In the process of executing the copy job by the parallel method, each time the printer 13 completes printing one sheet, the printer 13 notifies the copy control unit 124 of the print count. Also, when printing of all the print data of a document is completed, the printer 13 sends an end notification to the copy control unit 124.

Upon receiving the notification of the print count (YES in step S207), the copy control unit 124 decrements the number of printable sheets (step S208). That is, 1 is subtracted from the current number of printable sheets. Then, the copy control unit 124 determines whether the decremented number of printable sheets is less than or equal to the threshold value $\alpha$ (step S209). If the number of printable sheets is not less than or equal to the threshold value $\alpha$ (NO in step S209), the processes of step S206 and subsequent steps are repeated.

If an end notification is received from the printer 13 while repeating step S206 and the subsequent steps (NO in step S207), the process proceeds to step S231.

On the other hand, when the decremented number of printable sheets becomes less than or equal to the threshold value $\alpha$ while repeating step S206 and the subsequent steps (YES in step S209), the copy control unit 124 issues a job stop request to the scanner 12, the print data generation unit 123, and the printer 13 (step S210). In response to the job stop request, the scanner 12 stops scanning and acquiring scan data of the document. Further, the printer 13 stops printing in response to the job stop request. Once the scanner 12 and the printer 13 stop scanning and printing, the scanner 12 and the printer 13 send notifications to the copy control unit 124 (hereinafter referred to as "stop notification").

After issuing the stop request, the copy control unit 124 waits for the stop notifications from the scanner 12 and the printer 13 (step S211). Note that the printer 13 does not necessarily stop printing at the same time as the issuance of the stop request. Thus, the copy control unit 124 may receive a notification of the print count from the printer 13 before receiving the stop notification (NO in step S211). In this case (YES in step S212), the copy control unit 124 decrements the number of printable sheets (step S213). Note that the threshold value is desirably set up so that the number of printable sheets does not become a negative value due to decrementing the number of printable sheets in step S213.

Upon receiving stop notifications from both the scanner 12 and the printer 13 (YES in S211), the copy control unit 124 determines whether the number of printable sheets is greater than 0 (step S214). If the number of printable sheets is less than or equal to 0 (NO in step S214), the copy control unit 124 ends the copy job. Note that the number of printable sheets is ideally equal to 0 at this point. This would mean that copying has been executed by the high-speed parallel method for all the pages that can be copied within the allowable range corresponding to the remaining number.

On the other hand, if the number of printable sheets is greater than 0 (YES in step S214), the copy control unit 124 sets the operation method to the storage method in the print data generation unit 123 and sets 0 as a print target number (step S215). The print target number is a variable for holding the number of print data sets that are to be printed by the storage method from among the print data stored in the HDD 114.

Then, the copy control unit 124 issues a job start request to the scanner 12 and the print data generation unit 123 (step S216). As a result, the scanner 12 resumes scanning the document to acquire scan data of the document. Further, the print data generation unit 123 resumes generating print data based on the scan data stored in the buffer. Note, however, that because the operation method is set to the storage method, the print data generation unit 123 stores the generated print data in the HDD 114. Also, each time print data to be printed on one sheet is stored in the HDD 114, the print data generation unit 123 notifies the copy control unit 124 of the storage count. Further, when scanning of all the pages of the document is completed by the scanner 12 and generation of print data based on the scan data is completed, the print data generation unit 123 sends an end notification to the copy control unit 124.

The copy control unit 124 waits for a notification from the print data generation unit 123 (step S217). Upon receiving a notification from the print data generation unit 123 (YES in step S217), if the notification indicates the storage count (YES in S218), the copy control unit 124 decrements the number of printable sheets and increments the print target number (step S219). That is, 1 is subtracted from the number of printable sheets, and 1 is added to the print target number. Then, the copy control unit 124 determines whether the decremented number of printable sheets is 0 (step S220). When the number of printable sheets is greater than 0 (NO in step S220), the processes of step S217 and subsequent steps are repeated.

When an end notification is received from the print data generation unit 123 (i.e., when print data up to the final page of the document is generated before the number of printable sheets becomes 0) while repeating the processes of step S217 and the subsequent steps (NO in step S218), the process proceeds to step S227. On the other hand, when the number of printable sheets becomes 0 (YES in step S220), the copy control unit 124 issues a job stop request to the scanner 12 (step S221).

After issuing the stop request, the copy control unit 124 waits for a stop notification from the scanner 12 (step S222). Note that the scanner 12 does not necessarily stop scanning at same time as the issuance of the stop request. Thus, a notification of the storage count may be received from the print data generation unit 123 before the stop notification is received (NO in step S222). In this case (YES in S223), the copy control unit 124 decrements the number of printable sheets (step S224).

When a stop notification is received from the scanner 12 (YES in step S222), the copy control unit 124 determines whether the number of printable sheets is less than 0 (step S225). That is, the copy control unit 124 determines whether print data sets exceeding the number of printable sheets are stored in the HDD 114. If the number of printable sheets is less than 0 (YES in step S225), the copy control unit 124 deletes print data exceeding the print target number in reverse order of the storage order of the print data; i.e., starting with the print data that has been stored last (step S226). Then, the process proceeds to step S227. Note that the maximum value of the print target number is a value obtained by subtracting the number of sheets printed (by step S215) from the number of printable sheets that was initially set up (at the calculation process of step S201).

In step S227, the copy control unit 124 sets up an instruction in the printer 13 to print from the HDD 114. Then, the copy control unit 124 issues a job start request to the printer 13 (step S228). That is, printing by the printer 13 is resumed when the number of print data sets that are stored in the HDD 114 while printing by the printer 13 is put on hold (stopped) reaches the number of printable sheets set up at the time step S215 is executed. Based on the instruction to print from the HDD 114, the printer 13 starts printing the print data sets stored in the HDD 114 according to their storage order (step S229). Each time the printer 13 executes printing on one sheet, the printer 13 notifies the copy control unit 124 of the print count. Further, when printing of all the print data sets stored in the HDD 114 is completed, the printer 13 issues an end notification to the copy control unit 124. Note that print data of an amount within the number of printable sheets is stored in the HDD 114 at this point. Thus, even if all the print data stored in the HDD 114 is printed, printing beyond the number of printable sheets will not occur.

The copy control unit 124 waits until an end notification from the printer 13 is received (steps S229 and S230). When the copy control unit 124 receives an end notification from the printer 13 (YES in step S230), the remaining number updating unit 125 executes a process of updating the remaining number to a new remaining number (step S231). For example, the new remaining number may be obtained by subtracting (the actual number of sheets printed multiplied by the consumption rate of the remaining number of points per page) from the remaining number set up at the start of the copy job control process of FIG. 5. The remaining number updating unit 125 transmits the new remaining number and the login user name to the external server 20. In turn, the external server 20 updates the remaining number associated with the login user name to the new remaining number the received from the remaining number updating unit 125.

Note that the actual number of sheets printed can be obtained by adding the print count received in step S206 and the print count received in step S229. Also, a value calculated in step S201 may be used as the consumption rate of the remaining number of points per page, for example.

Note that in the above-described embodiment, print data beyond the print target number is deleted from the HDD 114 in step S226. However, in other embodiments, the process of step S226 may be omitted, and in step S228, the print target number may be communicated to the printer 13, for example. In this case, the printer 13 may issue an end notification to the copy control unit 124 at the time it has completed successively printing print data sets stored in the HDD 114 according to their storage order up to the print target number, for example.

As described above, according to an aspect of the present embodiment, the copy method (operation method) can be switched from the parallel method to the storage method in executing a copy job. In this way, the copy control unit 124 can accurately determine the timing at which the number of printable sheets becomes 0 such that output (copying or printing) beyond a prescribed limit (remaining number) can be prevented from occurring.

Further, according to an aspect of the present embodiment, a copy job is executed using the parallel method while the number of printable sheets is an adequately large number (i.e., while the number of printable sheets>threshold value $\alpha$). In this way, performance of the copying process may be prevented from being substantially degraded as a result of implementing measures to prevent execution of copying beyond a prescribed limit (remaining number).

Note that in the above-described embodiment, the remaining number associated with each user is stored in the external server 20. However, in other embodiments, the remaining number may be stored in the image forming apparatus 10 or in a device carried by the user, such an IC card or a smart terminal, for example.

Further, note that the scanner 12 in the above-described embodiment is an example of a scanning unit. The printer 13 is an example of a printing unit. The copy control unit 124 is an example of a control unit. The value obtained by subtracting the number of sheets printed (by step S215) from the maximum value of the print target number; i.e., the number of printable sheets (calculated in step S201) is an example of a first threshold value. The threshold value $\alpha$ is an example of a second threshold value. The HDD 114 is an example of a storage unit.

Note that a person skilled in the field of information processing technology may implement the present invention using an application specific integrated circuit (ASIC) or an apparatus in which circuit modules are connected.

Further, each of the functions (units) described in connection with the above embodiments may be implemented by one or more circuits.

The one or more circuits described above may include a processor programmed by software to execute a corresponding function, and/or hardware, such as an ASIC or a circuit module, designed to execute a corresponding function, for example.

Although the present invention has been described above with reference to certain illustrative embodiments, the present invention is not limited to these embodiments, and numerous variations and modifications may be made without departing from the scope of the present invention.

What is claimed is:

1. An image forming apparatus comprising:
   a scanner configured to perform a scanning operation to acquire image data of a document;
   a printer configured to perform a printing operation to print data including the acquired image data in parallel with the scanning operation of the scanner;
   a processor; and
   a memory storing program instructions that cause the processor to
      determine a first threshold value that indicates a remaining number of pages that may be printed of a printable page limit value,
      determine whether the first threshold value is greater than a second threshold value, and
      control the printer to suspend performing the printing operation in parallel with the scanning operation in a case where the first threshold value is equal to or less than the second threshold value, wherein, for the duration of when performance of the printing operation in parallel with the scanning operation is suspended, the processor
      controls the scanner to store the acquired image data in a storage device, and
      controls the printer to resume the suspended printing operation using the acquired image data stored in the storage device, when a number of pages of the acquired image data stored in the storage device has reached the first threshold value.

2. The image forming apparatus according to claim 1, wherein the execution of the program instructions further causes the processor to
   control the scanner to suspend the scanning operation with respect to the document when a number of pages of the acquired image data has reached the first threshold value.

3. The image forming apparatus according to claim 1, wherein the first threshold value is set up by a user.

4. An image forming method to be implemented by an image forming apparatus including a scanner configured to perform a scanning operation to acquire image data of a document and a printer configured to perform a printing operation to print data including the acquired image data in parallel with the scanning operation of the scanner, the information processing method comprising:
   determining a first threshold value that indicates a remaining number of pages that may be printed of a printable page limit value,
   determining whether the first threshold value is greater than a second threshold value, and
   controlling the printer to suspend performing the printing operation in parallel with the scanning operation in a case where the first threshold value is equal to or less than the second threshold value, wherein for the duration of when the performance of the printing operation in parallel with the scanning operation is suspended, the processor
      controls the scanner to store the acquired image data in a storage device, and
      controls the printer to resume the suspended printing operation using the acquired image data stored in the storage device, when a number of pages of the acquired image data stored in the storage device has reached the first threshold value.

5. The information processing method according to claim 4, wherein the scanner is controlled to suspend the scanning operation with respect to the document when a number of pages of the acquired image data has reached the first threshold value.

6. The information processing method according to claim 4, wherein the first threshold value is set up by a user.

7. A computer program product comprising a non-transitory computer-readable medium having computer-readable instructions recorded thereon that are executable by an image forming apparatus including a scanner configured to perform a scanning operation to acquire image data of a document and a printer configured to perform a printing operation to print data including the acquired image data in parallel with the scanning operation of the scanner, the computer-readable instructions causing the image forming apparatus to implement processes of:
   determining a first threshold value that indicates a remaining number of pages that may be printed of a printable page limit value, determining whether the first threshold value is greater than a second threshold value, and controlling the printer to suspend performing the printing operation in parallel with the scanning operation in a case where the first threshold value is equal to or less than the second threshold value, wherein for the duration of when the performance of the printing operation in parallel with the scanning operation is suspended, the processor controls the scanner to store the acquired image data in a storage device, and controls the printer to resume the suspended printing operation using the acquired image data stored in the storage device, when a number of pages of the acquired image data stored in the storage device has reached the first threshold value.

8. The computer program product according to claim 7, wherein the scanner is controlled to suspend the scanning operation with respect to the document when a number of pages of the acquired image data has reached the first threshold value.

9. The computer program product according to claim 7, wherein the first threshold value is set up by a user.

* * * * *